United States Patent Office 2,778,830
Patented Jan. 22, 1957

2,778,830

PRODUCTION OF 2-AMINOPYRIMIDINES

Heinrich Pasedach, Ludwigshafen (Rhine), and Matthias Seefelder, Ludwigshafen, Rhine-Oppau, Germany, assignors to Badische Anilin- & Soda-Fabrik Aktiengesellschaft, Ludwigshafen (Rhine), Germany No Drawing. Application July 26, 1954,
Serial No. 445,890

2 Claims. (Cl. 260—256.4)

This invention relates to an improved process for the production of 2-aminopyrimidines.

Two main methods have hitherto been known for the production of 2-aminopyrimidines, according to which guanidine is reacted either with beta-dicarbonyl compounds or with acetylene aldehydes or ketones. These initial materials are, however, expensive and in some cases accessible only with difficulty. In particular the acetylene aldehydes and ketones are obtainable from the corresponding acetylene alcohols by oxidation only in very moderate yields not exceeding 50% and are so unstable that they give bad and fluctuating yields of 2-aminopyrimidines by reaction with guanidine.

We have now found that 2-aminopyrimidines can be prepared in a simpler manner from technical initial materials by allowing oxidizing agents to act in acid medium on mixtures of guanidine and primary or secondary acetylene alcohols in which the acetylene group is directly attached to the carbinol group. The preparation and isolation of the unstable acetylene aldehyde or ketone is thus avoided.

The guanidine is preferably used in the form of its salts, as for example as carbonate or sulfate. Suitable acetylene alcohols are for example propargyl alcohol, butyne-(1)-ol-(3) or phenyl-(1)-propyne-(1)-ol-(3).

Any oxidizing agent which has an oxidizing action in acid medium may be used in principle, in particular the higher oxides of chromium, manganese, iron or lead or the corresponding salts. It is advantageous to use an excess of these oxidizing agents, f. e. 130 to 170% of the theoretical amount.

As the acid medium there may be used aqueous solutions of any strong acid which is stable against the oxidizing agent used, for example sulfuric and phosphoric acids. It is also possible, however, to add organic solvents or diluents which are stable to the oxidizing agents used.

The reaction takes place at ordinary temperature but more rapidly at moderately elevated temperature, for example at about 40° to 80° C.

There are first obtained the salts of the 2-aminopyrimidines with the acid used, and the free bases can be set free therefrom by the conventional methods. The yields are usually good. With reference to the acetylene alcohol used as initial material, the yields are better than by the known method in which the acetylene alcohol is first oxidized to acetylene aldehyde or ketone without adding guanidine.

The 2-aminopyrimidines thus accessible in a convenient and worthwhile manner are valuable intermediates, especially for pharmaceutical products.

The following examples will further illustrate this invention but the invention is not restricted to these examples. The parts are parts by weight.

Example 1

56 parts of propargyl alcohol are added to a solution of 90 parts of guanidine carbonate in a mixture of 200 parts of water and 110 parts of concentrated sulfuric acid and, while stirring at 50° to 60° C. a mixture of 120 parts of chromium trioxide, 80 parts of concentrated sulfuric acid and 200 parts of water is gradually run in in the course of several hours. The mixture is stirred for another 2 hours at 50° C. and then excess barium carbonate is added. The precipitate of barium sulfate and chromium hydroxide is boiled up several times with water. The combined filtrates are weakly acidified and concentrated under reduced pressure. The concentrate is made alkaline with caustic alkali solution and then extracted with ether. By evaporating the ether, pure 2-aminopyrimidine having the melting point 127° C. is obtained. The yield is about 30% of the theoretical yield with reference to the propargyl alcohol used.

If the propargyl alcohol is first oxidized to propargyl aldehyde and this then reacted with guanidine, the yield is only about 15% of the theoretical yield with reference to the propargyl alcohol used.

Example 2

A solution of 90 parts of guanidine carbonate in a mixture of 200 parts of water and 250 parts of concentrated sulfuric acid is mixed with 70 parts of butyne-(1)-ol-(3). While stirring, a solution of 100 parts of chromium trioxide in 200 parts of water and 160 parts of concentrated sulfuric acid is allowed to flow in during the course of several hours so that the temperature of the mixture does not exceed 50° C. It is then further stirred for 2 hours at 50° C. and worked up in the same way as in Example 1.

Pure 2-amino-4-methylpyrimidine of the melting point 157° C. is obtained in a yield of about 25% of the theoretical yield with reference to the amount of butyne-(1)-ol-(3) used; if the latter is first oxidized to butyne-(1)-one-(3) and this then reacted with guanidine, the yield, with reference to butyne-(1)-ol-(3), is remarkably poorer.

Example 3

56 parts of propargyl alcohol are introduced into a solution of 90 parts of guanidine carbonate in 580 parts of 60% sulfuric acid; 115 parts of manganese dioxide are then introduced gradually at 80° C. while stirring. The whole is heated for another half hour at 80° C. and the manganese is then precipitated with caustic alkali solution. The precipitate is filtered off by suction, boiled several times with water and the combined filtrates concentrated strongly. After adding further caustic alkali solution, the exhaustively concentrated solution is extracted with benzene. After drying and distilling off the benzene there remains 2-aminopyrimidine in a yield of about 28% of the theoretical yield.

We claim:

1. An improved process for the production of 2-aminopyrimidine which comprises introducing a solution of chromium trioxide in about 50 to 60% sulfuric acid into a solution of about equivalent amounts of guanidine carbonate and propargyl alcohol in excess about 50 to 60% sulfuric acid at from about 50° to 60° C.

2. An improved process for the production of 2-aminopyrimidine which comprises introducing manganese dioxide into a solution of about equivalent amounts of guanidine carbonate and propargyl alcohol in excess about 60% sulfuric acid at 80° C.

References Cited in the file of this patent

UNITED STATES PATENTS 2,449,908    Prevost  ---------------  Sept. 21, 1948